Sept. 28, 1954  C. H. HENNINGSEN  2,690,280
SOLDER FLUX DISPENSER
Filed June 19, 1952

Charles Harvey Henningsen
INVENTOR.

BY
Attorneys

Patented Sept. 28, 1954

2,690,280

UNITED STATES PATENT OFFICE 2,690,280

SOLDER FLUX DISPENSER

Charles Harvey Henningsen,
New Monmouth, N. J.

Application June 19, 1952, Serial No. 294,507

1 Claim. (Cl. 222—457)

My invention relates to improvements in solder flux dispensers for use in coating the ends of electric wires with solder.

By way of explanation, it is the practice in the manufacture of electric wires for electronic equipment to coat the ends of the wires with solder, preparatory to coating with tin, and by dipping said ends in solder flux in an open container.

The solder flux becomes too thick for use when exposed to the air in an open container and must frequently be replaced, which is wasteful and expensive.

Having the foregoing in mind, the primary object of my invention is to provide a simply constructed, inexpensive, fountain type solder flux dispenser including a solder flux receptacle adapted to be opened and closed as occasion may require and to which solder flux is fed from a source of supply to replenish and maintain the solder flux in the receptacle at a constant level for dipping of the ends of the wires therein to a uniform depth, and whereby the solder flux may be maintained in proper condition for use as long as the supply lasts.

Other and subordinate objects within the purview of my invention, together with the precise nature of my improvements, will be readily understood when the succeeding description and claim are read with reference to the drawing accompanying and forming part of this specification.

Figure 1:
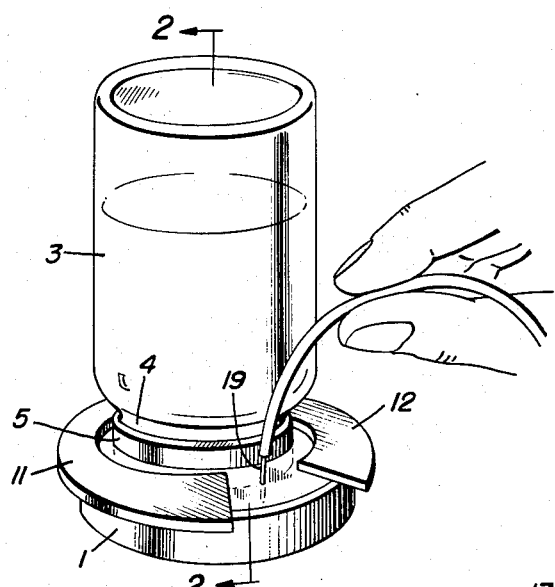
Figure 1 is a view in perspective of my improved solder flux dispenser, in the preferred embodiment thereof.
Figure 2:
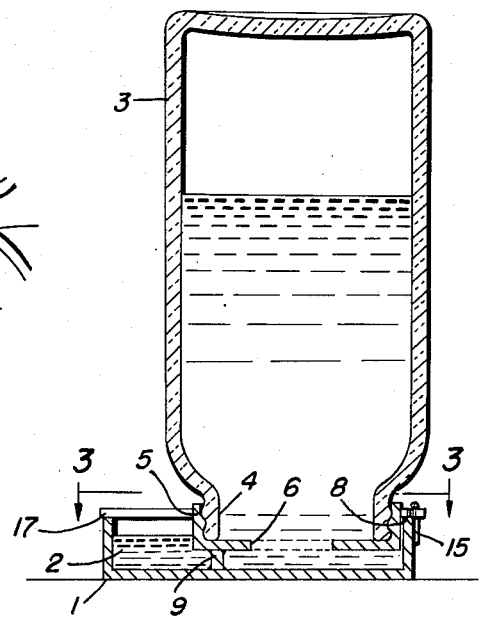
Figure 2 is a view in vertical section taken on the line 2—2 of Figure 1 and drawn to a larger scale.

Referring to the drawing by numerals, according to my invention, as illustrated, an open top receptacle is provided for containing solder flux 2 at a given level and which preferably has the form of a flat bottomed, circular pan and is designated by the numeral 1. The receptacle 1 may be formed of any suitable material for containing the flux 2. A solder flux supply receptacle 3 in the form of an inverted transparent jar of smaller diameter than the receptacle 1 and having a reduced externally threaded neck 4 is provided for feeding the solder flux 2 into the receptacle 1.

A support 5 for holding the supply receptacle 3 in inverted position by the neck 4 thereof above the receptacle 1 is provided in the form of an inverted jar cap into which the neck 4 of the receptacle 3 is threaded and which is provided with a central discharge opening 6.

The support 5 is fastened in the receptacle 1 in elevated position to establish the level of the solder flux 2 in the receptacle 1, and in axially offset relation to said receptacle 1 so as to space the same and the receptacle 3 further from one side of the receptacle 1 than from the opposite side, whereby to provide a relatively wide front dipping space 7 in said receptacle 1. The support 5 projects slightly above the top of the receptacle 1 for a purpose presently seen. The support 5 is fastened in horizontal position in the receptacle 1 by soldering to said opposite, or rear, side of the receptacle 1, as at 8, and by a leg 9 diametrically opposite the solder 8 and rising from the bottom of the receptacle 1. The leg 9 may be fixed to the bottom of the support 5 and to the bottom of the receptacle 1 by any suitable means.

A pair of arcuate, opposite closure flaps 11, 12 for the top of the receptacle 1 are hinged, in coplanar relation, at corresponding ends 13, 14 thereof to said opposite or rear side of the receptacle 1 for relative swinging horizontally in wiping engagement with the rim of the receptacle 1 to open and close the top of said receptacle 1. The hinge may comprise a staple 15 inserted downwardly through said ends 13, 14 and soldered, as at 16, to said opposite, or rear side of the receptacle 1.

The closure flaps 11, 12 are provided with free straight front ends 17, 18 engaging flush when said flaps are closed, and said flaps flare edgewise from the hinged ends 13, 14 thereof to said free ends 17, 18 to fit, when closed, around and in engagement with the support 5 and close the top of the receptacle 1.

Figure 3:
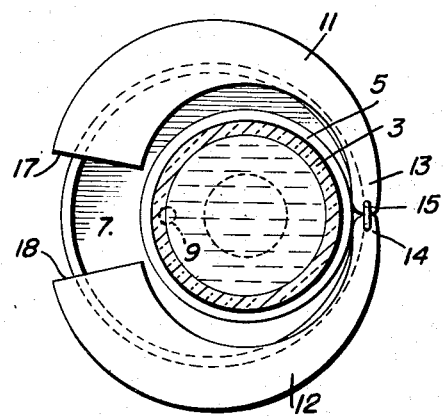
Figure 3 is a view in horizontal section taken on the line 3—3 of Figure 2 with the closure flaps opened.
Figure 4:
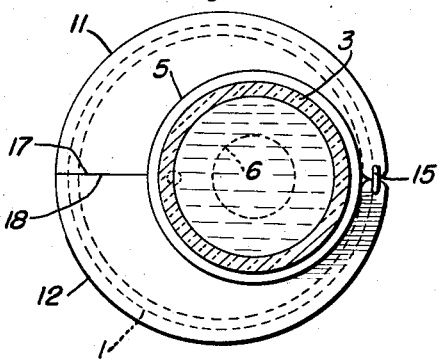
Figure 4 is a similar view with the closure flaps closed.
Figure 5:
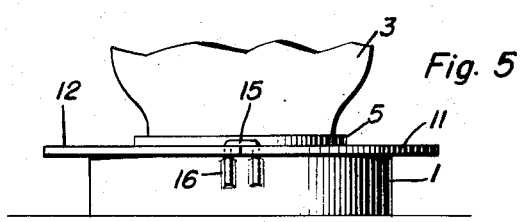
Figure 5 is a fragmentary view looking at the rear side of the solder receptacle.

As will be obvious, the supply receptacle 3 feeds solder flux 2 into the receptacle 1 as long as the supply lasts. By opening the closure flaps 11, 12 at the free ends thereof as shown in Figures 1 and 3, the wide front space 7 in the receptacle 1 may be uncovered for access thereto for dipping the ends of wires 19 therein as shown in Figure 1 to coat the ends with the solder flux 2. When the dipping operation is completed, the closure flaps 11, 12 may be closed to form a substantially airtight cover for the receptacle 1 suitable for preventing deterioration of the solder flux in the receptacle 1 by exposure to the air.

The foregoing will, it is believed, suffice to impart a clear understanding of my invention without further explanation.

Manifestly, the invention, as described, is susceptible of modification, without departing from the inventive concept, and right is herein reserved to such modifications as fall within the scope of the appended claim.

Having described my invention, what is claimed as new is:

A fountain dispenser for solder flux comprising an open top circular pan for receiving the solder flux, a solder flux supply receptacle having a neck, an apertured annular support in said pan supporting said receptacle by the neck thereof in inverted position to pass the flux through the support into the pan, means fastening the support in the pan in elevated eccentric position at one side thereof to establish the level of the solder flux in the pan and provide a wider space in the pan at the opposite side thereof, and a pair of opposite coplanar closure flaps flaring edgewise and hinged at the narrower ends thereof to said first-mentioned side of the pan for horizontal movement in wiping engagement with the top of the pan into open and closed position to open and close said top, said flaps having inner edges forming a circle and fitting around said support when the flaps are closed and said flaps also having straight wider free ends engaging flush radially of the support when the flaps are closed.

References Cited in the file of this patent

UNITED STATES PATENTS

| Number | Name | Date |
|---|---|---|
| 184,713 | Karshner | Nov. 28, 1876 |
| 820,062 | Mottlau | May 8, 1906 |
| 2,426,119 | Partin | Aug. 19, 1947 |
| 2,573,802 | Mitchell | Nov. 6, 1951 |

FOREIGN PATENTS

| Number | Country | Date |
|---|---|---|
| 4,848 | Great Britain | Oct. 1, 1898 |
| 180,066 | Germany | Jan. 20, 1906 |